Nov. 8, 1927. 1,648,848
A. HUGUENIN
HYDRAULIC WORKS UTILIZING THE POWER OF TIDES
Filed March 16, 1927
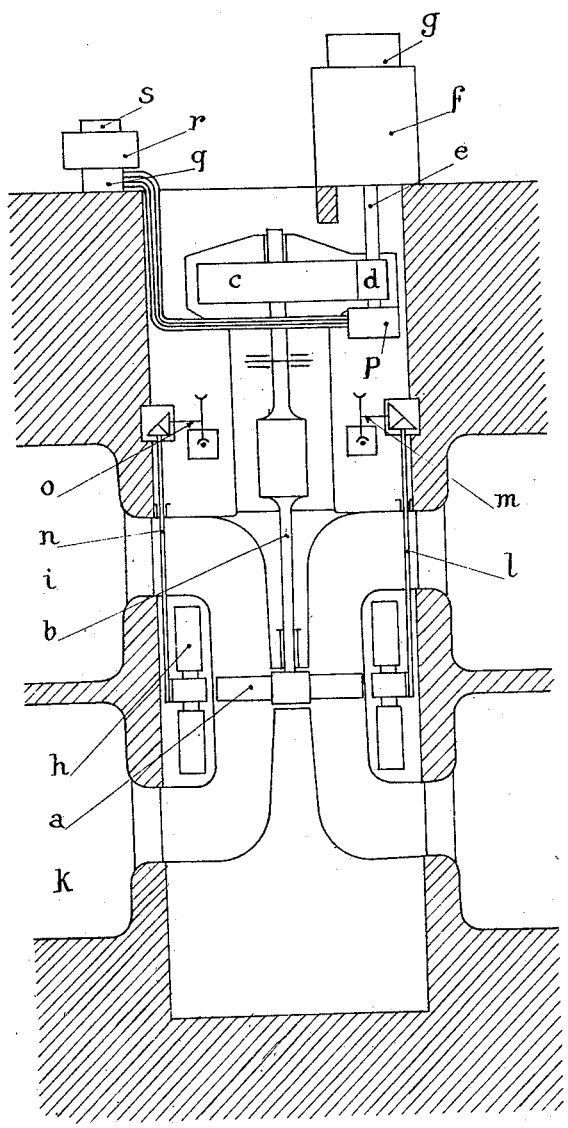

Patented Nov. 8, 1927.

1,648,848

UNITED STATES PATENT OFFICE.

ALBERT HUGUENIN, OF PARIS, FRANCE.

HYDRAULIC WORKS UTILIZING THE POWER OF TIDES.

Application filed March 16, 1927, Serial No. 175,841, and in France March 18, 1926.

Hydraulic or water works which utilize the power of tides are known in which the machine for generating the electric current in each group, comprising a turbine and an electric current generator consists in an asynchronous machine. For the purpose of producing a current of constant tension and frequency, the effect of variation of the number of revolutions of the group, due to the variation in the height of fall, is compensated or balanced in causing, during the operation, the electrical connections of the electric machine or ratio of gear between this machine and a driving turbine to vary, in using simultaneously at least one phase compensator for the purpose of avoiding unfavorable changes of phase and at least one synchronous generator with independent drive for securing the number of periods in case a synchronized machine is not used.

In other well known plants, the asynchrous machines are synchronized by the continuous running and remain asynchronous only during speed changes. Finally, plants are known in which dynamos with direct current are substituted for alternators, the compensation of variations in the number of revolutions of the turbine being obtained by the variation of the excitation of the dynamo with direct current or any other known means modifying the electric data of the said direct current dynamo.

The present invention has for its purpose to cover a way of carrying out the construction of the generator in the form of an alternator allowing not only to obtain a certain range of speeds which are always but definite graduations over the whole scale but not an absolutely gradual variation of the speed while maintaining constant the tension and the periodicity of the current.

It relates to an asynchronous alternator with collector which, due to the variation in the position of brushes, can operate with a constant tension and frequency for a varying speed in a gradual manner. The diswatted current will be supplied to every asynchronous alternator with collector by an asynchronous condenser, for example an overexcited synchronous alternator running at a constant speed, this constant speed being obtained by a gradual variation of the transmission or gear ratio between the shaft of the turbine of the asynchronous alternator provided with a collector and its own shaft.

A form of construction of such a group is represented, by way of example, in cross section, in the single figure of the accompanying drawing.

$a$ denotes the driving wheel of the turbine, which, through the shaft $b$ drives by means of a speed increasing or multiplying train or set of gear wheels $c—d$, the shaft $e$ of the asynchronous alternator $f$ with collector, this collector $g$ being located at the upper part.

$h$ is the double distributor shown in the position it occupies when it is entirely removed from the outlet pipes of the motive or driving water which pipes connect the volutes $i$ and $k$.

By means of the rods $l$ and of the mechanism shown at $m$, the double distributor can be lifted or lowered at will and the position of the directing vanes can be adjusted by means of the shafts $n$ and the mechanism $o$, so that the outlet pipes or channels can be left open or be closed.

The transmission with variable ratio $p—q$, which can be either hydraulic or electric, drives at a constant speed the synchronous condensator $r$ which carries endwise its exciter $s$ and which, on the one hand, supplies the diswatted current to the alternator $f$ and, on the other hand, fixes the periodicity for this same asynchronous alternator $f$.

This combination allows every turbine-alternator group to be entirely independent, to generate individually for every group the diswatted current which is necessary to the asynchronous alternator and it further allows, by the simple mechanical adjustment of the position of brushes on the collector $g$, to obtain, with a very good efficiency and a change of phases which is practically null over the whole range of speeds, a three phase current of a constant tension and periodicity, the gradual variation of the speed of shaft $b$ with the constantly varying fall securing on the other hand a maximum output or efficiency of the turbine itself.

It will be understood that the form of construction which has been hereinbefore described has only been given by way of example and that the same, while keeping its essential features, can be constituted by parts which are different from those which have been represented by way of example. The synchronous condensator, instead of being particular to each group, can also be common to a certain number of these groups and be operated by any constant speed motor, either an electric motor or athermic motor, whatever its nature may be, or finally by an hydraulic turbine which can on its turn be installed in any plant forming part of the considered network.

Having thus described my apparatus, what I claim as new therein, and my own invention, is:

In an hydraulic work or plant utilizing the power of tides, a group comprising a turbine and a generator of electric current, the said generator being constituted by an asynchronous alternator with collector which, in virtue of a variation of the brushes, can operate with a constant tension and frequency corresponding to a variable speed in a gradual manner, a synchronous condensator adapted to supply diswatted current to the said asynchronous alternator with collector, the said synchronous condensator being adapted to operate with a contant speed which is obtained by the gradual variation of the ratio of gear between the shaft of the said group and the shaft of the said synchronous condensator.

In testimony whereof I have hereunto affixed my signature.

ALBERT HUGUENIN.